US007337307B1

(12) United States Patent
Rozas et al.

(10) Patent No.: US 7,337,307 B1
(45) Date of Patent: Feb. 26, 2008

(54) EXCEPTION HANDLING WITH INSERTED STATUS CHECK COMMAND ACCOMMODATING FLOATING POINT INSTRUCTION FORWARD MOVE ACROSS BRANCH

(75) Inventors: Guillermo J. Rozas, Los Gatos, CA (US); David Dunn, San Jose, CA (US); Robert Cmelik, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 89 days.

(21) Appl. No.: 10/938,091

(22) Filed: Sep. 10, 2004

Related U.S. Application Data

(63) Continuation of application No. 09/603,743, filed on Jun. 26, 2000, now Pat. No. 6,826,682.

(51) Int. Cl.
*G06F 9/302* (2006.01)

(52) U.S. Cl. ....................................... 712/244; 712/222

(58) Field of Classification Search ..................... None
See application file for complete search history.

(56) References Cited

U.S. PATENT DOCUMENTS 5,778,211 A 7/1998 Hohensee et al.
5,778,219 A * 7/1998 Amerson et al. ........... 712/244
6,021,488 A 2/2000 Eisen et al.
6,151,669 A * 11/2000 Huck et al. ................. 712/222
6,185,668 B1 * 2/2001 Arya ........................... 712/23
6,223,278 B1 4/2001 Morrison
6,295,601 B1 9/2001 Steele, Jr.

* cited by examiner

*Primary Examiner*—Kenneth S. Kim

(57) ABSTRACT

A process which automatically inserts commands that test for and raise exceptions indicating floating point status exceptions into a sequence of instructions to be executed, re-ordering a pipelined instructions by moving a floating point instruction from after a branch instruction to before the branch instruction, and responds to exceptions in execution of the sequence of instructions by returning execution to a point in the sequence of instructions at which correct state is known and then executing each instruction in the sequence singly to completion so that exceptions in pipelined floating point instructions can be automatically detected and handled precisely.

18 Claims, 3 Drawing Sheets

300

INSERTING A COMMAND INTO SAID PIPELINED INSTRUCTIONS THAT TESTS FOR GENERATED FLOATING POINT STATUS EXCEPTIONS
310

RE-ORDERING SAID PIPELINED INSTRUCTIONS BY MOVING A FLOATING POINT INSTRUCTION FROM AFTER SAID BRANCH INSTRUCTION TO BEFORE SAID BRANCH INSTRUCTION
320

EXECUTING SAID PIPELINED INSTRUCTIONS AS RE-ORDERED
330

STORING LAST COMMITTED STATE OF A FLOATING POINT STATUS REGISTER
340

COMPARING THE LAST COMMITTED STATE WITH CONDITION OF CURRENT FLOATING POINT STATUS REGISTER WHEN THE COMMAND THAT TESTS FOR GENERATED FLOATING POINT STATUS EXCEPTIONS IS EXECUTED
350

EXCEPTION HANDLING WITH INSERTED STATUS CHECK COMMAND ACCOMMODATING FLOATING POINT INSTRUCTION FORWARD MOVE ACROSS BRANCH

This is a continuation of application Ser. No. 09/603,743 filed on Jun. 26, 2000 now U.S. Pat. No. 6,826,682 which is hereby incorporated by reference to this specification which designated the U.S.

BACKGROUND OF THE INVENTION

1. Field of the Invention

This invention relates to computer systems and, more particularly, to methods for accelerating floating point operations in computer systems.

2. History of the Prior Art

Recently, a new microprocessor was developed which combines a simple but very fast host processor (called a "morph host") and software (referred to as "code morphing software") to execute application programs designed for a "target" processor having an instruction set different than the instruction set of the morph host processor. The morph host processor executes the code morphing software to translate the application programs into morph host processor instructions which accomplish the purpose of the original target software. As the target instructions are translated, the new host instructions are both executed and stored in a translation buffer where they may be accessed without further translation. Although the initial translation of a program is slow, once translated, many of the steps normally required for hardware to execute a program are eliminated. The new microprocessor has demonstrated that a simple fast processor designed to expend little power is able to execute translated "target" instructions at a rate equivalent to that of the "target" processor for which the programs were designed.

In order to be able to run programs designed for other processors at a rapid rate, the morph host processor includes a number of hardware enhancements. One of these enhancements is a gated store buffer which resides between the host processor and the translation buffer. A second enhancement is a set of host registers (in addition to normal working registers) which store known state of the target processor existing prior to any sequence of target instructions being translated. Memory stores generated as sequences of translated morph host instructions are executed are placed in the gated store buffer. If the morph host instructions execute without raising an exception, the target state at the beginning of the sequence of instructions is updated to the target state at the point at which the sequence completed and the memory stores are committed to memory.

On the other hand, if an exception is raised during execution of the morph host instructions, execution stops, the host processor rolls back operation to the last point at which target state was known to be correct, and execution proceeds from that point utilizing a process (an interpreter in one embodiment) which accomplishes step-by-step translation of each of the target instructions. This process essentially single steps through the execution of target instructions. As each target instruction is translated and executed, the state of the target processor is brought up to date. The process continues during the translation and execution of the remainder of the sequence of target instructions until the exception reoccurs. When the exception reoccurs, target state will be correct for handling the exception. The use of these hardware enhancements with the rollback process allows exceptions to be accurately handled while dynamic translation of target instructions is taking place. The improved processor is described in detail in U.S. Pat. No. 5,958,061, entitled Combining Hardware And Software to Provide An Improved Microprocessor, R. Cmelik et al., issued Feb. 29, 2000, and assigned to the assignee of the present invention.

A problem which has occurred with the new processor relates to the execution of floating point operations translated from instructions originally programmed for a target processor. Floating point processors execute some mathematical operations quite rapidly. For example, multiplication of floating point values requires simply adding exponents consisting of zeroes and ones and multiplying the mantissas by shifting a binary point. On the other hand, addition of mantissas requires a pre-normalization step of aligning binary points, an addition, and finally a post-normalization step of realigning the binary point. Consequently, most floating point operations require a number of clock cycles and are therefore somewhat slow. In fact, all operations other than square root and division require four clock cycles to execute utilizing the new microprocessor. Division and square root operations take an indeterminate amount of time and may require halting the operations of the processor until they complete.

Because floating point operations require a number of clock cycles to execute, most modern floating point processors (including the floating point processor unit of the new microprocessor) pipeline floating point operations. Pipelining executes a number of floating point operations in parallel and usually starts a new floating point operation on each succeeding clock cycle. The effect of running operations in parallel which start on sequential clocks is to produce one floating point result for each clock cycle during most sequences of floating point operations.

Modern floating point processors not only pipeline operations but also attempt to reorder floating point operations to attain even greater speed. However, floating point operations are difficult to reorder. Not only do floating point processors produce a numerical result as output for each operation, they also typically provide a number of status bits which indicate whether the result should raise an exception. These status bits indicate whether an operation caused an overflow or an underflow, whether an operation was invalid, whether an operand was not in a normal number format (i.e., was "denormal"), whether the operation attempted a divide by zero, and whether the precision provided by the result is inexact. Each of these conditions could require exceptional handling in order for the result to be correct. A user may arm or disarm individual exceptions to produce the results desired. The precise exceptions are defined by the floating point standard of IEEE 754.

When translating target instructions designed for execution by a target processor, it is necessary to provide instructions which produce the same results as would the target processor. For example, if the target instructions are designed to be executed by an Intel X86 processor, then the translated instructions should produce the same results as would be produced by an X86 processor. The early Intel X86 processors (more particularly, the X87 floating point unit) handled floating point operations one at a time and generated both a result and status bits for that result immediately after each individual floating point operation. X86 processors have continued to function in this manner.

Consequently, it is necessary for the new processor when translating X86 floating point instructions to provide the same status bits which are correct for each result as the result issues.

Providing correct status bits with each result as the result issues is especially difficult when pipelining floating point operations since the status bits for a floating point operation are not known until the floating point operation completes, typically four cycles after commencing. The prior art has found no solution to the problem of producing accurate status bits with each result produced other than to terminate pipelining of floating point operations and handle floating point operations one at a time.

Providing correct status bits with each result while pipelining operations in the new processor is not only difficult because of the delay in generating status bits, the condition of status bits also complicates floating point operations which have been reordered to a position in a sequence of operations at which state is to be committed by the new processor. In order to function correctly, the status bits must be correct not only for those floating point operations which have executed in their normal order but also for those floating point operation which have been reordered before state including the status bits can be committed.

Although the prior art has not been able to provide correct status bits without stopping the pipeline, there have been different solutions for terminating the pipeline. For example, the Alpha processor designed by Digital Equipment Corporation simply ignores the problem of issuing correct status together with the result of a floating point operation in order to run floating point operations at a speed attainable by pipelining. However, a programmer may insert commands into a program to be executed by an Alpha processor which select sequences of floating point operations which are to produce precise floating point status. When a program reaches a command inserted by a programmer to materialize precise floating point state, the processor stalls and drains its pipeline (finishes executing floating point instructions in flight) so that after the pipeline is drained, the pipeline corresponds to all previously executed floating point instructions. Exceptions, if pending and enabled, are raised at this point; and only after the exceptions have been handled can subsequent floating point instructions start to execute.

In a situation in which exceptions must be raised precisely after any floating point instruction, each floating point instruction must be followed by the special commands, effectively disabling the pipelining and reordering of floating point instructions. These commands allow a programmer to decide which floating point operations should execute accurately even though very slowly. However, since a programmer will not necessarily understand where status exceptions may be raised by floating point operations, long sequences of operations may often have to be selected for this slow mode of operation.

Intel Corporation takes a different approach which it calls safe instruction recognition. Modern Intel X86 processors pipeline floating point operations but utilize complex circuitry for evaluating floating point numbers prior to executing any floating point operation to determine whether those numbers might produce results giving rise to the exceptions denoted by the status bits. For each set of floating point numbers utilized in an operation, a decision is made (1) that these numbers certainly will not generate an exception and thus may be processed using pipelining or (2) that it is not certain that the numbers will not generate an exception so that the pipeline must be stalled and the operations processed one by one. The approach allows pipelining but requires a significant increase in circuitry to pre-evaluate floating point operands and operations and slows operations through its conservative approach.

Neither of these approaches provides an optimum result which allows a floating point processor to execute as rapidly as possible utilizing full pipelining techniques while assuring that correct status for each individual floating point operation is produced.

It is desirable to improve the operational speed of the improved microprocessor by increasing the speed of floating point operations.

SUMMARY OF THE INVENTION

It is an object of the present invention to provide pipelined floating point operations which produce precise results.

This and other objects of the present invention are realized by a combination including a process which automatically inserts commands which test for and raise exceptions indicating floating point status exceptions into a sequence of instructions to be executed during dynamic translation of target instructions, and a process for responding to exceptions by rolling execution of a sequence of instructions back to a point at which correct state is known whereby exceptions in pipelined floating point instructions can be automatically detected and handled precisely.

These and other objects and features of the invention will be better understood by reference to the detailed description which follows taken together with the drawings in which like elements are referred to by like designations throughout the several views.

DETAILED DESCRIPTION

Figure 1:
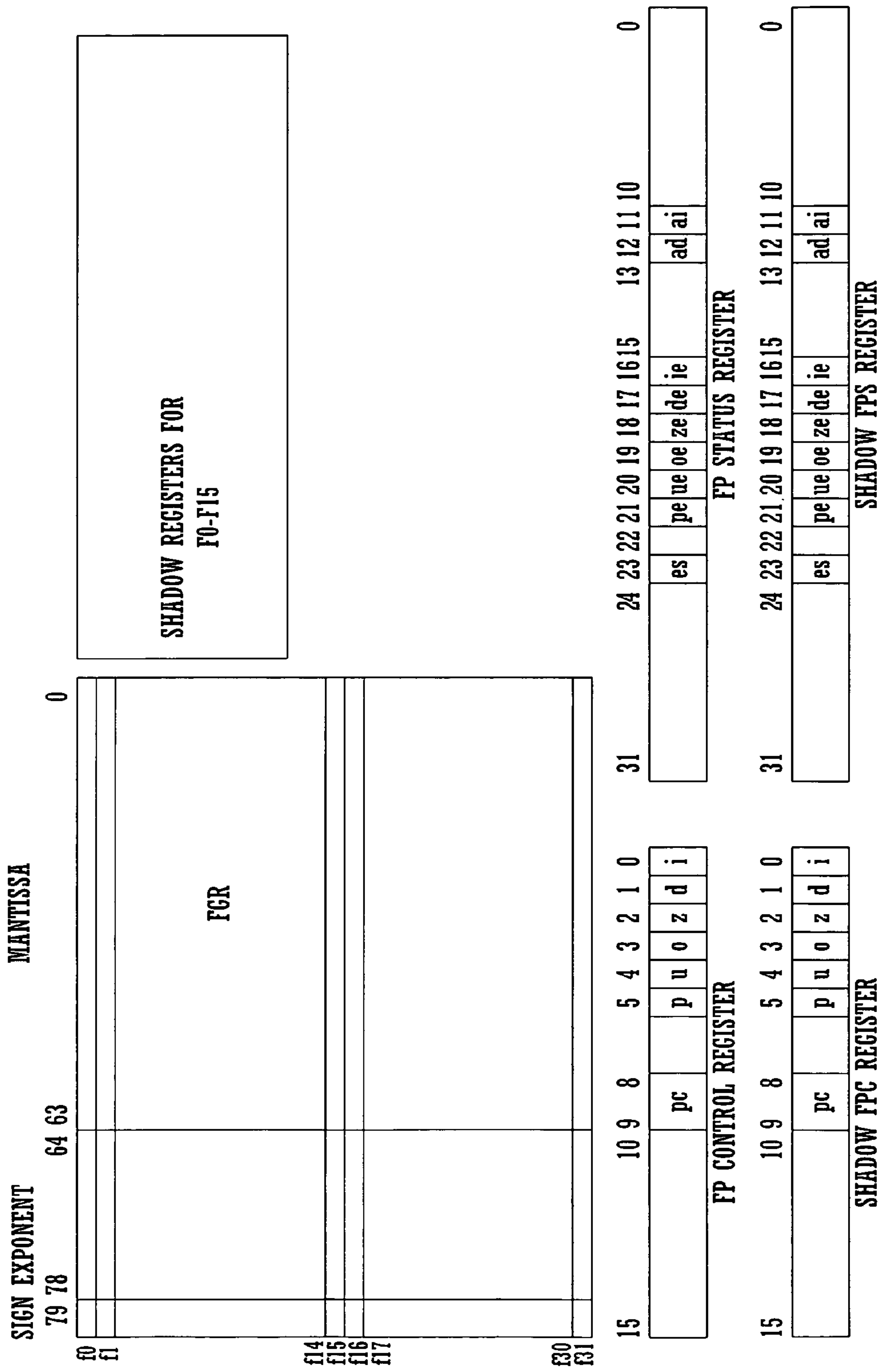
FIG. 1 is a diagram illustrating elements of a first embodiment of the invention.

The present invention utilizes new commands that may be executed by a floating point unit to test for exceptions while pipelining the execution of floating point instructions. These commands are utilized by the new processor in combination with circuitry (such as the floating point unit of the new processor which is illustrated in FIG. 1) and a basic process used by the new processor to recover from the results of exceptions. The basic process utilized is one by which the new processor temporarily stores the results of execution of translations until it is known that a sequence of translations will execute without error. Using this process, the processor is able to either commit correct results of translations or to roll back to the last point in execution at which accurate state of the target processor was known if an exception is encountered.

In accordance with the present invention, a new command "Fbarr" is automatically inserted by the translation software in a sequence of translated instructions after the last of any floating point commands and before the "commit" command that causes state to be saved. The translator merely tests for floating point instructions in a sequence, and inserts an Fbarr instruction just before a Commit instruction in any sequence of commands which include floating point operations. The sequence is then executed utilizing the normal pipelining process until the Fbarr command is reached. The Fbarr operation compares floating point status bits at completion of the last floating point operation with the arming condition of floating point status bits before the Commit command is executed. If necessary to allow the last floating point operation to complete, the Fbarr command stalls the pipeline. If no status bits are detected which represent exceptions which are armed, the results of the execution of the sequence of translated instructions are committed; and the floating point unit continues executing in the pipelined mode. On the other hand, if the Fbarr operation detects a status bit which indicates an exception that is armed, the process described above for recovering from exceptions is initiated. Execution rolls back to the point at which last correct state existed; and the processor executes the floating point commands of the sequence one at a time in the naive order in which they were furnished by the target application. Executing the floating point operations one at a time determines the result and the status bits for each floating point operation before the next floating point operation commences.

Since the new processor includes circuitry specifically designed to hold state generated during interim periods between commit operations in which a sequence of translated instructions are executed as well as the means to roll back to a previous point in execution if particular exceptions are generated, the new processor is admirably adapted for pipelining a sequence of floating point instructions. The automatic inclusion of the new command and its enabling circuitry in association with the rollback process allows high speed pipelining to take place until an armed floating point exception is detected just prior to a commit operation at which state must be correct. The status bits exceptions which are generated during any floating point operation of the sequence are made cumulative so that all exceptions which have occurred during the sequence may be detected. Thus, for example, an overflow status will be reported if one or more of the floating point operations during the sequence overflow.

The process by which the new processor rolls back to a previous commit point having known correct state in response to exceptions and then translates and executes instructions one at a time to completion (committing state as each is executed correctly) assures that any floating point instruction reporting an exception is accurately detected.

Thus, combining the automatic insertion of the new command with the arrangement for temporarily storing the results of execution of translations and rolling back if an exception is encountered allows the new processor to continually execute floating point operations in pipelining mode yet automatically detect floating point status exceptions as they occur to provide precise results without slowing operations except when actual unmasked exceptions are generated.

The invention is simple to implement in that it requires only that the translator software insert an Fbarr instruction after the last floating point command and before the commit command in any sequence of translated host instructions which includes floating point commands (and in place of any target instruction which checks the condition of the floating point status bits).

The following is a sequence of host floating point instructions:

Fadd % f4,% f5,% f6//add data in R5 and R6 and put result in R4,

Fsub % f0,% f8,% f9//subtract data in R9 from data in R8 and put result in R0,

Fbarr//compare status bits with armed conditions and generate exception causing rollback if exist, Branch→Cmt//if branch, commit present state, Fmul % f1,% f4,% f0//multiply data in R4 by data in R0 and put result in R1, Fsqrt % f7,% f4//compute squareroot of data in R4 and put result in R7, Fbarr Branch→Cmt If, after the execution of the add and subtract operations leading to the first branch, no exception is generated by Fbarr, pipeline execution of the floating point operation continues along the main thread. If the branch is taken, state is committed immediately. On the other hand, if the Fbarr command generates an exception, the exception causes software to roll back execution to a point at which last known correct state existed. From this point, translation and execution proceed one target instruction at a time. As each target instruction is translated and executed, a separate Fbarr instruction followed by a commit reviews floating point exceptions. The commit after each branch assures that the final state at each step is committed if the branch is taken so that when the unmasked floating point exception is again reached, the floating point status is correct.

A problem with the minimal implementation of the invention is that the Fbarr instruction does stall and drain the pipeline if a floating point instruction has not yet completed when the Fbarr instruction begins to execute. This can cause as much as a three cycle delay in operation since the typical floating point instruction requires four cycles to execute. Stalling the pipeline slows the operation of the new processor. In order to alleviate this problem somewhat, scheduling software of the translator typically packs the sequence of floating point instructions with a sufficient number of "no-op" instructions between the last floating point instruction and an Fbarr instruction to eliminate stalling and draining the pipeline.

Another technique used by the translator in order to eliminate the stalling effect of the Fbarr command is to place any Fbarr command with a commit command off the main path of execution at the beginning of a branch operation. This results in longer sequences of instructions occurring between commits if a branch is not taken.

Thus, in the above sequence, instances of both the commit instruction and the Fbarr instruction which precedes it are moved to follow a branch:

Fadd % f4,% f5,% f6

Fsub % f0,% f8,% f9

Branch→Fbarr→Cmt

Fmul % f1,% f4,% f0

Fsqrt % f7,% f4

Branch→Fbarr→Cmt

As may be seen, when so scheduled, the floating point instructions continue to execute for what may be an extensive sequence without committing state so long as a branch is not taken. When a Fbarr instruction is ultimately executed before a commit, any accumulated floating point exceptions are tested against armed exceptions. If no armed exceptions are detected when the Fbarr operation compares status bits and armed exceptions, the pipelining mode continues. If armed exceptions are detected, execution rolls back to the previous commit point and single steps from that point so that precise floating point exceptions are detected at the target instruction which raised them.

Combining the automatically-inserted Fbarr instruction and the rollback process allows the new processor to pipeline execution of floating point instructions without attention to whether status exceptions may be raised yet determine precisely those exceptions which are raised. This eliminates the need of some prior art processors for a programmer to determine each specific floating point instruction for which the pipeline must be stalled and drained in order to provide precise floating point exceptions. It also eliminates the complicated and expensive circuitry other prior art processors require to evaluate floating point operands and operations before executing each floating point operations in order to determine whether to run in pipeline mode or one instruction at a time.

Although the automatic use of the Fbarr instruction provides significant improvement over the arrangements of the prior art, the Fbarr instruction (even when utilized in a branch) does stall and drain the pipeline if a floating point instruction has not yet completed when the Fbarr instruction is ready to execute. This can cause a delay in operation of as much as a three cycles for the typical floating point instruction which requires four cycles to execute. Stalling the pipeline slows the operation of the new processor.

In order to effectively translate floating point instructions originally programmed for a particular family of target processors, it is also necessary that the new processor reproduce the idiosyncrasies produced by the target processors.

For example, in order to correctly translate floating point instructions intended for the floating point unit of an X86 processor, it is necessary to produce the results and status exceptions which would be produced by a floating point unit having eight registers arranged in a stack architecture. Such a floating point unit utilizes a "push" command to place data in a register designated "top-of-stack" and a "pop" command to remove data from the top-of-stack register. Such a unit carries out arithmetic operations between operands in top-of-stack and other stack registers. The unit also carries out arithmetic operations on operands in top-of-stack and in memory.

The new processor carries out floating point operations utilizing a large plurality of general purpose floating point registers as illustrated in FIG. 1 of the drawing. Providing the same result and status exceptions for intra-stack arithmetic operations utilizing the floating point registers of the new processor does not give rise to significant problems involving floating point exceptions; the operands exist in the same floating point format so that exceptions raised relate to the basic floating point operations.

However, operands in memory can exist in other formats than those in registers emulating stack registers. Conversions of operands from these other formats can raise exceptions which are not related to the basic floating point operation. For example, denormal and invalid exceptions can be generated because the operands resulting from conversion may be too large or small to fit the normal floating point formats or may lead to invalid operations. Thus, it is possible for a single target operation to raise a plurality of floating point exceptions. Which exceptions are raised and how they are raised depends on the priority between exceptions.

An X86 processor carries out arithmetic operations between operands in top-of-stack and in memory by a single instruction which handles all of the exceptions involved. Even though the native X86 floating point unit utilizes a single instruction to accomplish the operation, the unit distinguishes between exceptions generated by an operand in the top-of-stack register and exceptions generated by operands in memory while executing floating point operations which accomplish arithmetic results between top-of-stack register and memory.

On the other hand, the new processor breaks a floating point arithmetic operation involving a memory operand into two operations. The first loads a temporary floating point register from the memory address; the second manipulates the operand in the temporary address and the operand in the floating point register representing the top-of-stack to accomplish the arithmetic operation. There is a possibility for the manner of raising the exceptions to be inconsistent with the handling by the target processor. For example, some arithmetic operations of the new processor cancel some exceptions raised by load operations.

In order to assure that the floating point unit of the new processor produces the same exceptions as a native X86 unit, a new exception is provided for each of the possible cases which might arise. To accomplish this, the new processor utilizes a new instruction "Flda" to accomplish the load of one of the general floating point registers (shown in FIG. 1) when it is used as a temporary register to hold a memory operand used during a stack arithmetic operation. The Flda instruction detects denormal and invalid operand conditions in the data and sets an auxiliary bit in the floating point status register if either occurs. Thus, if the Flda instruction loads a denormal operand to the temporary register, it records the exceptional condition as an "AD" bit in the floating point status register. If the Flda instruction loads an operand to the temporary register which would cause an invalid operation, it records the exceptional condition as an "AI" bit in the floating point status register. Because these exceptions are included so that the status that results will conform to that of a native X86 floating point unit, the bits are always armed. These two positions in the FP status register allow the new processor to provide the same floating point exception state as would be provided by a native X86 floating point unit. When it detects these armed bits, an Fbarr instruction will generate an exception indicating that a Flda instruction has loaded a denormal operand or an operand.

However, the use of these new exception bits also causes status exceptions to be generated under certain circumstances in which a native X86 unit would not generate an exception. For example, because the auxiliary status exceptions are always armed, the detection of a denormal load by a Flda instruction will always report a denormal exception even though the denormal exception itself is not armed by the original target program. Thus, when the Fbarr instruction executes, this exception will be generated, the new processor will roll back to the last commit and begin single step operation. This could slow the operation of the processor even though the result will always be correct.

One of the techniques used to accelerate operations in computers is to reorder instructions so that they execute in a different sequence. For example, in the example described previously, it might be desirable to move the multiply instruction from the latter part of the sequence to occupy a position formerly filled by a no-op instruction above the first branch operation (as shown below) in order to accelerate operations.

```
Fadd % f4,% f5,% f6
Fsub % f0,% f8,% f9
Fmul % f1,% f4,% f0
Branch→Fbarr→Cmt
Fsqrt % f7,% f4
Branch→FBarr→Cmt
```

However, although moving an operation may be allowed, moving an operation above a branch is not normally allowed. First, if the multiply operation reports an exception such as overflow and the branch is taken, then the floating point status which is saved as state by the commit includes the report of this exception even though the exception may not be armed. This is incorrect state for the execution path through that branch because the exception would not have been reported had the multiply instruction not been moved above the branch. Moreover, moving the multiply instruction above the branch causes the Fbarr instruction after a branch leading to a commit to stall the pipeline in order to provide sufficient time for the multiply instruction to execute completely before detection of exceptions. This undesirably slows execution.

Figure 2:
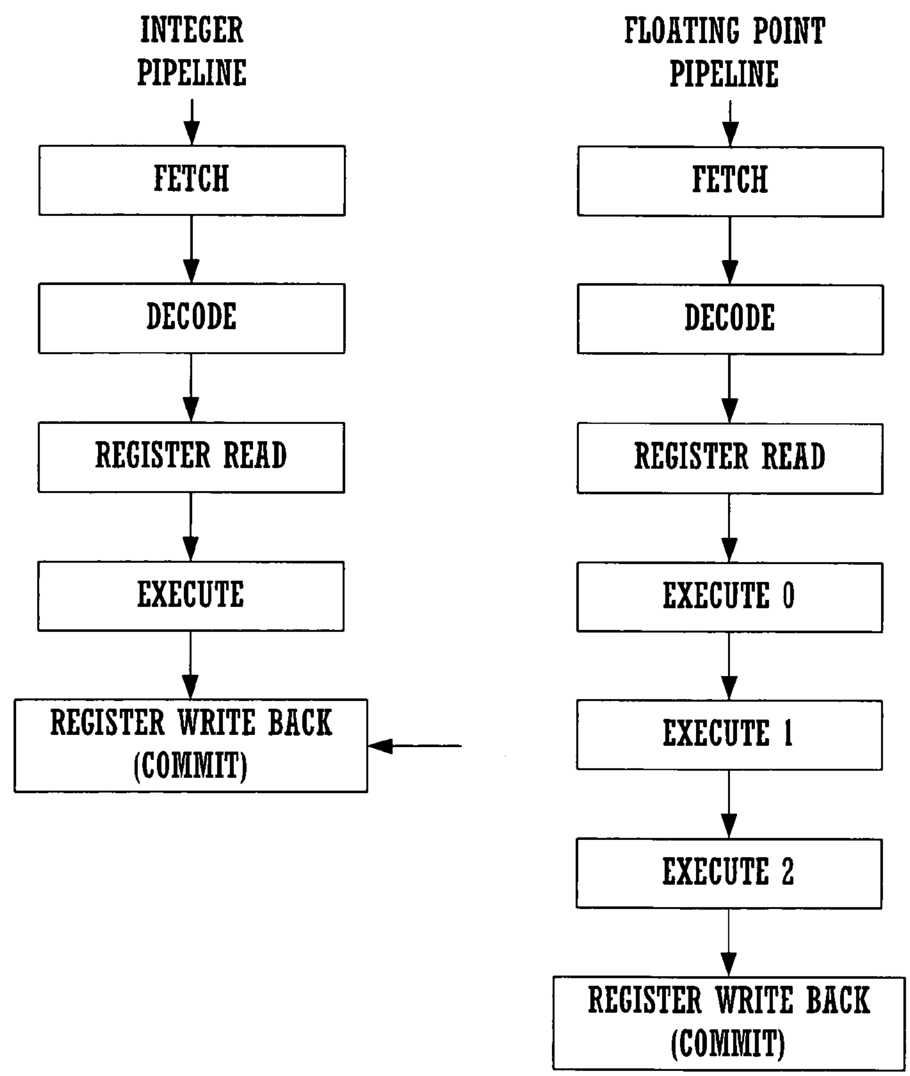
FIG. 2 is a diagram illustrating timing details of integer and floating point pipelines of a processor utilizing the invention.

FIG. 2 illustrates the integer pipeline and the floating point pipeline of the new processor. As may be seen, the integer pipeline cycles through a sequence including fetch, decode, register read, execute, and register write back stages, the last stage being the point at which data is available for a commit operation. All integer instructions that can raise exceptions do so at the end of the execute stage of the integer pipeline (at arrow in figure). On the other hand, the floating point pipeline cycles through a sequence including fetch, decode, register read, execute0, execute1, execute2, and register write back stages, the last stage again being the point at which a result is available for a commit operation. The only floating-point instruction that can raise an exception is FBARR (and variants) which would naively occur at the end of the execute2 stage of the floating-point pipeline. Thus, a floating point operation is not ready to be committed until two extra cycles of operation have taken place following the point at which an integer commit occurs.

However, the processor must not allow any operation results to be written back until the containing instruction is guaranteed not to raise an exception. To do so would commit state which is at best indeterminate and at worst in error.

One way to assure that both integer and floating point operations have completed and all exceptions have been raised before committing is to add additional holding registers or latches to hold and bypass integer state until the last possible exception has been raised. However, requiring extra holding and bypassing logic for the integer pipeline which would artificially lengthen the integer pipeline to match the floating-point pipeline so that all exceptions could be raised at the end of the floating-point pipeline is an undesirable hardware complication.

In order to simplify the exception-raising logic of the processor in accordance with the invention, all instructions raising an exception raise it in the same stage of the pipeline, and as early as possible. This requires that the FBARR instruction (and variants) be made to execute early in the pipeline. More particularly, the FBARR instruction is made to execute on integer timing. That is, it raises exceptions at the same pipeline stage that an integer instruction would if they were combined into the same parallel execution unit (e.g., VLIW instruction). The manner in which this is accomplished is disclosed below.

However, causing Fbarr to execute in this manner presents a problem. If Fbarr raises exceptions in execute0, the results and status of floating-point operations in the execute1 and execute2 stages of the floating-point pipeline which have not completed at this point are not yet known even though they were issued earlier than the FBARR instruction. The simplest way to solve this problem is to make the FBARR instruction stall the pipeline if there is anything in the execute1 and execute2 stages. This guarantees that the FBARR instruction can test the status bits set by any earlier floating-point instruction. However, as described earlier, stalling the pipeline is undesirable.

In order to correct all of these difficulties as well as problems raised by portions of the solution, a number of changes are made to the new processor. Although the changes are considered individually in the discussion which follows, the changes are utilized together to obviate the problem.

First, a new instruction Fbarrns (non-stalling Fbarr) is utilized by the new processor. This instruction may be used by the translator in place of the Fbarr instruction to test the status conditions raised by the floating point operations against the armed exceptions. This instruction conducts the same tests as does the Fbarr instruction but does not, however, stall the pipeline so that the floating point instructions which are still executing may complete. Thus, if the Fbarr instruction in the first branch of the last example is replaced by an Fbarrns instruction as follows:

Fadd % f4,% f5,% f6
Fsub % f0,% f8,% f9
Fmul % f1,% f4,% f0
Branch→Fbarrns→Cmt
Fsqrt % f7,% f4
Branch→Fbarr→Cmt Then the multiply instruction may be moved above the branch without slowing execution when the branch is taken. If the Fbarrns instruction is placed at least three instructions after the subtract instruction, the result of the multiply operation and any exception state generated by execution of that instruction will not be available when the Fbarrns instruction executes as long as no stalls are incurred by the intervening instructions. This resolves the timing problem caused by moving floating point instructions above a branch.

However, utilizing the Fbarrns instruction without other changes does not keep state from being committed at the end of the floating-point pipeline since a non-stalling Fbarr and a commit occur in the same VLIW instruction in the new processor. The Fbarrns instruction will not test the status bits of the instructions still in the execute1 and execute2 stages, but the commit which executes during write-back commits those status bits. The state of the status bits in the floating point status register at the execution of the Fbarrns instruction will be indeterminate and possibly incorrect since additional operations have occurred during the three cycles intervening since the subtract instruction. Thus, the Fbarrns instruction may be detecting perfectly innocuous state and yet commit incorrect exception-raising state because the instructions incurring floating-point exceptional conditions have not been tested but will be committed.

To solve this problem, the floating point pipeline circuitry is modified in accordance with the invention in a manner that, when the Fbarrns instruction is executed, the condition of the floating point status register which is detected and committed to a shadow floating point status register is the status representing the condition of the status bits at the point at which the preceding subtract instruction completed and is ready to be committed. This status may be determined by a simple wiring change which detects status bits residing in a latch at the appropriate point of the pipeline representing status bits at the completion of the preceding instruction. Thus, the state held in the floating point status register is committed on integer timing, during the write-back stage of the integer pipeline instead of the write-back stage of the floating-point pipeline. If there are no unarmed exceptions when tested by Fbarrns, the state can be committed. If there are new armed exceptions, the Fbarrns instruction will raise an exception, and commit will be prevented from occurring.

Of course, the instructions still in execute1 and execute2 can detect and accrue exceptional conditions, but these exceptions do not belong to the current target state since they relate to operations scheduled speculatively by the translation software. These status bits should not be tested at this point but will be tested by a future Fbarr (or Fbarrns) instruction and committed by a subsequent commit operation.

Even though the use of the Fbarrns instruction and the change in circuitry allowing commit of floating point status to occur at the time of the integer commit make it possible to reorder floating point instructions above a branch operation, these changes only allow instructions to be moved into those three positions in the pipeline which occur less than three cycles before the Fbarrns instruction. If the pipeline is delayed for some reason or the instructions are moved above those positions, any status exceptions which their execution generates will be saved as a part of the commit of the floating point status register. The exceptions particular to any instruction moved above that point will be committed incorrectly by the commit instruction if the branch is taken.

To overcome this limitation, an additional change has been combined with the other changes. If a floating point instruction is moved above the last three cycles of the floating point pipeline prior to a commit and execution of the moved instruction generates a detectable exception, the exception does not cause any new floating point state to be committed if the particular exception has already been committed. Since floating point exceptions accumulate, an additional exception does not occasion change of a status bit when it is committed. By holding in a shadow FP status register (shown in FIG. 1) last committed state of the FP status register, it can be compared with the condition of the FP status register when Fbarr is executed. Only if a new status bit has been generated which did not exist at the previous commit is an exception actually generated. This allows floating point instructions to be moved to positions as far above a branch as just below the last commit instruction. This facility allows quite radical reordering of floating point operations in a manner never practiced by prior art processors.

Figure 3:
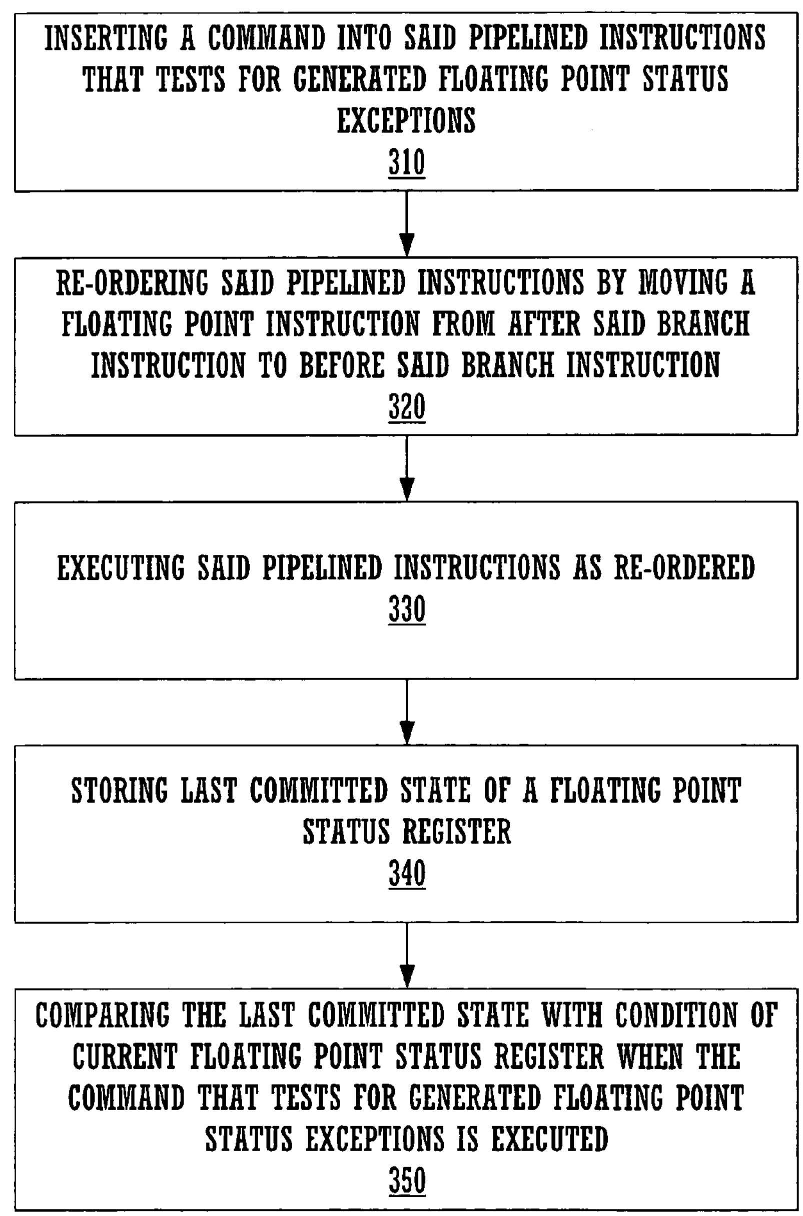
FIG. 3 is a flow diagram in accordance with one embodiment of the present invention.

Referring now to FIG. 3, a flow diagram in accordance with one embodiment of the present invention is shown. At step 310, a command that tests for generated floating point status exception is inserted into the pipelined instruction. At step 320, the pipelined instructions are re-ordered by moving a floating point instruction from after a branch instruction to before the branch instruction. At step 330, the pipelined instructions as re-ordered are executed and at step 340, the last committed state of a floating pint status register is stored. At step 350, the last committed state is compared with condition of the current floating pint status register when the command that tests for generated floating point status exception is executed.

The technique described above allows the invention to overcome the problem raised by the auxiliary status bits which slow the operation of the floating point unit by stalling the pipeline when a floating point instruction which generates an auxiliary denormal bit is moved above a branch during reordering. The condition of the regular denormal status bit when last committed can be determined from the shadow FP status register. If the regular denormal status bit has already been reported and the denormal exception is not armed, then the generation of the new auxiliary denormal bit during an arithmetic operation between top-of-stack and memory does not matter. When these conditions exist at execution of the Fbarr or Fbarrns instructions, they are simply ignored.

By combining these changes, floating point instructions may be moved above a branch beyond the three cycle limit without generating incorrect state. This allows tight looping operations to complete in a much shorter time than would be possible utilizing prior art floating point units. The ability to use either the Fbarrns instruction or the Fbarr instruction allows selection of the reordering in the manner described. In cases where the translator understands and can predict the operations which will occur after the branch, the translator will tend to utilize the Fbarrns instruction to obtain the extra processing speed. In cases where this knowledge is unavailable from the program, the translator may select the Fbarr instruction, utilize no-ops, and restrict instruction movement to positions between commit instructions.

Although the present invention has been described in terms of a preferred embodiment, it will be appreciated that various modifications and alterations might be made by those skilled in the art without departing from the spirit and scope of the invention. For example, although the invention has been described in terms of a processor which translates instructions from one instruction set to another, automatic insertion might also be accomplished by compiler software designed for preparing application programs and the like for a more conventional processor so long as that processor utilizes a rollback techniques for dealing with exceptions. If such software is then executed by such a processor, the same advantageous results will be produced. The invention should therefore be measured in terms of the claims which follow.

What is claimed is:

1. A method of re-ordering pipelined instructions comprising a branch instruction and floating point instructions for increased execution performance thereof, said method comprising:
- inserting a command into said pipelined instructions that tests for generated floating point status exceptions;
- re-ordering said pipelined instructions by moving a floating point instruction from after said branch instruction to before said branch instruction;
- executing said pipelined instructions as re-ordered;
- storing a last committed state of a floating point status register; and
- comparing said last committed state with condition of current floating point status register when said command that tests for generated floating point status exceptions is executed.

2. The method of claim 1, wherein the command that tests for generated floating point status exceptions is inserted after said branch instruction in said pipelined instructions.

3. The method of claim 1, further comprising generating an exception if said comparing said last committed state with condition of said current floating point status register indicates that a floating point exception occurred since state was last committed.

4. The method of claim 1, in which the command compares accumulated condition of exception status detected during execution of the instructions with armed floating point exception conditions.

5. The method of claim 1, in which the command executes and compares accumulated condition of exception status detected when integer status is saved.

6. The method of claim 1, in which exception status detected includes exceptions generated by a command for manipulating memory operands used in floating point stack operations.

7. The method of claim 6, in which no exception is raised if the corresponding exceptions generated by the command for manipulating memory operands used in floating point stack operations are not armed and have already been reported.

8. The method of claim 1, in which the command is inserted in said instructions between a last floating point instruction and an instruction that saves floating point status.

9. The method of claim 8, in which the command stalls the pipelined instructions if the last floating point instruction has not completed execution when status is to be saved.

10. The method of claim 8, in which the command does not stall the pipelined instructions if the last floating point instruction has not completed execution when status is to be saved.

11. The method of claim 10, in which floating point status saved is floating point status existing when integer status is saved.

12. The method of claim 10, in which floating point status saved is floating point status generated by floating point operations which have completed when integer status is saved.

13. An apparatus for re-ordering pipelined host instructions comprising a branch instruction and floating point instructions for increased execution performance thereof, said apparatus comprising:

a computer-executable software process that automatically inserts commands that test for generated floating point status exceptions into said pipelined host instructions to be executed during dynamic translation of target instructions;

a computer-executable software process for re-ordering said pipelined host instructions by moving a floating point instruction from after said branch instruction to before said branch instruction;

a computer-executable software process for executing said pipelined instructions as re-ordered;

a computer-executable software process for storing a last committed state of a floating point status register; and a computer-executable software process for comparing said last committed state with condition of current floating point status register at the time said command that tests for generated floating point status exceptions is executed.

14. The apparatus of claim 13, wherein said computer-executable software process that automatically inserts commands inserts one of the commands after said branch instruction.

15. The apparatus of claim 13, further comprising:

a computer-executable software process generating an exception if said comparing said last committed state with condition of said current floating point status register indicates that a floating point exception occurred since last committed state.

16. The apparatus of claim 13, in which the computer-executable software process that automatically inserts commands inserts one of the commands in said instructions between a last floating point instruction and an instruction that saves floating point status.

17. The apparatus of claim 16, in which the command stalls the pipelined instructions if the last floating point instruction has not completed execution when status is to be saved.

18. The apparatus of claim 16, in which the command does not stall the pipelined instructions if the last floating point instruction has not completed execution when status is to be saved.

* * * * *